United States Patent [19]

Andrus, Jr.

[11] Patent Number: 5,622,534

[45] Date of Patent: Apr. 22, 1997

[54] HIGH PERFORMANCE, MULTI-STAGE, PRESSURIZED, AIRBLOWN, ENTRAINED FLOW COAL GASIFIER SYSTEM

[75] Inventor: Herbert E. Andrus, Jr., Granby, Conn.

[73] Assignee: Combustion Engineering, Inc., Windsor, Conn.

[21] Appl. No.: 336,604

[22] Filed: Nov. 9, 1994

Related U.S. Application Data

[63] Continuation of Ser. No. 999,511, Dec. 30, 1992, abandoned.

[51] Int. Cl.$^6$ .................................................. C10J 3/76
[52] U.S. Cl. ................................... 48/77; 48/69; 48/203
[58] Field of Search .............................. 48/197 R, 202, 48/203, 206, 210, DIG. 2, DIG. 4, 69, 77, 73, 67, 76; 252/373; 110/171; 122/5

[56] References Cited

U.S. PATENT DOCUMENTS

| | | | |
|---|---|---|---|
| 2,516,141 | 7/1950 | Newman et al. | 48/203 |
| 4,158,552 | 6/1979 | Blaskowski et al. | 48/203 |
| 4,400,181 | 8/1983 | Snell et al. | 48/63 |
| 4,457,764 | 7/1984 | Dorling et al. | 48/69 |
| 4,602,573 | 7/1986 | Tanca | 48/203 |
| 4,610,697 | 9/1986 | Darling et al. | 48/27 |
| 4,680,035 | 7/1987 | Tanca | 48/69 |
| 4,721,514 | 1/1988 | Kikuchi et al. | 48/203 |

*Primary Examiner*—Timothy McMahon
*Attorney, Agent, or Firm*—Arthur E. Fournier, Jr.

[57] ABSTRACT

A high performance, multi-stage, pressurized, airblown, entrained flow coal gasifier system and a method of operating such a gasifier system for generating therewithin fuel gas from coal. The subject gasifier system includes an outer, pressure containing vessel surrounding an inner, water-cooled vessel wherein the gasification reaction, through which the fuel gas is generated from coal, takes place. The inner, water-cooled vessel embodies a first stage within which the high temperatures required for the gasification reactions to take place as well as for slagging are generated from the combustion of char, a second stage within which the char is gasified to generate the subject fuel gas, and a third stage within which coal is devolatilized to produce the char for the first stage and the second stage and with a concomitant quenching being effected of the fuel gas as the latter flows through the third stage of the inner water-cooled vessel.

1 Claim, 3 Drawing Sheets

HIGH PERFORMANCE, MULTI-STAGE, PRESSURIZED, AIRBLOWN, ENTRAINED FLOW COAL GASIFIER SYSTEM

This is a continuation of application Ser. No. 07/999,511, filed Dec. 30, 1992, now abandoned.

BACKGROUND OF THE INVENTION

This invention relates to coal gasifiers, and more specifically, to a high performance, multi-stage, pressurized, airblown, entrained flow coal gasifier system and a method of operating the same.

The Government of the United States of America has rights in this invention pursuant to Contract No. DE-FC21-90MC 26308.

Current governmental air pollution standards limiting the level of emissions from the stacks of fossil fuel-fired power generation equipment have created an urgent need for clean burning fuels. An obvious solution to this problem is to burn fuels which are low in particulate matter and sulfur content, and to do so in a manner that will minimize $NO_x$ emissions. However, such fuels are in relatively short supply and also are relatively more expensive.

One solution to the problem, particularly in the United States where the basic proven energy reserves are predominantly coal, is the gasification of coal to produce a fuel gas suitable for firing in a steam generator and similar devices, or for firing in a gas turbine, which is part of an integrated gasification combined cycle system (IGCC). Generally speaking, coal gasification involves the reaction of coal, at high temperatures, with a gas containing oxygen, and steam to produce a gas, containing principally carbon monoxide (CO) and hydrogen ($H_2$), which is suitable for use as a fuel gas.

The processes, which to date have been employed for purposes of achieving coal gasification, can be conveniently divided into three categories:
1. Fixed bed gasification where lump coal is supported on a grate or by other means and the flow of gas and coal may be concurrent or countercurrent;
2. Fluidized bed gasification where crushed or fine coal is fluidized by the gasifying medium, giving an expanded fuel bed that can be visualized as boiling liquid; and
3. Suspension or entrainment gasification where fine coal is suspended in the gasifying medium such that the fine coal particles move with the gasifying medium either linearly or in a vortex pattern.

At one time fixed bed gasifiers were felt by many to be the most attractive from the standpoint of economics. In this regard, the economically desirable features of fixed bed gasifiers were deemed to encompass the following features: their inherent relatively high carbon conversion ratio, the fact that a low producer volume is required per unit of gas production, and the fact that a minimum amount of fuel preparation is required in connection with the use thereof.

By way of exemplification and not limitation, one example of a fixed bed gasifier is that which forms the subject matter of U.S. Pat. No. 3,920,417 entitled "Method of Gasifying Carbonaceous Material", which issued on Nov. 18, 1975 and which is assigned to the same assignee as the present patent application. In accordance with the teachings of U.S. Pat. No. 3,920,417, there is provided a method of producing a clean low BTU fuel gas by the reaction of a carbonaceous fuel with free oxygen and steam in a downdraft fixed bed gasifier. The material to be gasified is introduced at the upper end of the fixed bed gasifier where it is preheated, dried and devolatilized by a stream of hot gas from the lower zones of the fixed bed gasifier, which has been drawn upward and which is withdrawn from the fixed bed gasifier at the upper end thereof. This upward flow of gas also serves to maintain the ignition level of the carbonaceous fuel material at a predetermined level within the oxidation zone of the fixed bed gasifier. The portion of gas withdrawn from the upper end of the fixed bed gasifier, which contains the volatiles released by the carbonaceous material, is reintroduced into the fixed bed gasifier in the oxidation zone where the temperature is sufficiently high to effect thermal cracking of the volatiles to valuable hydrocarbon compounds. Continuing, as the carbonaceous fuel material moves downward through the shaft of the fixed bed gasifier it passes successively through oxidation and reduction zones where air or some other free oxygen containing gas, and steam, respectively, are introduced into the fixed bed gasifier. The resulting reactions convert the carbonaceous fuel material and other reactants to an incandescent char matrix extending to the shaft of the fixed bed gasifier, gaseous products (the makeup thereof depending upon the level of the fixed bed gasifier), and a molten slag.

A subsequent modification in the design of fixed bed gasifiers wherein a second stage has been added in cooperative association with the fixed bed gasifier forms the subject matter of U.S. Pat. No. 4,069,024 entitled "Two-Stage Gasification System", which issued on Jan. 17, 1978 and which is assigned to the same assignee as the present application. In accordance with the teachings of U.S. Pat. No. 4,069,024, there is provided a method and apparatus for directing a low BTU content synthesis gas, as produced in a fixed bed gasifier, for example, of the type previously disclosed in U.S. Pat. No. 3,920,417, through a second stage having a serially interconnected pyrolyzer of so-called "spouting bed" design wherein the hot synthesis gas from the fixed bed gasifier is contacted by a hot carbonaceous charge and lime to utilize its high sensible heat to produce a cool, higher BTU product. Reactions take place between some of the carbon of the charge and hydrogen of the gas to increase the hydrocarbon content of the gas before it is conducted to its place of use, while the lime reacts with the sulphur to reduce if not eliminate the sulphur content of the gas. The remaining charge of char is devolatilized and passed on to the fixed bed gasifier where a hot oxidizer and steam are added thereto to produce more synthesis gas that is supplied back to the second stage, i.e., to the pyrolyzer, for reaction with the carbonaceous charge and lime.

Turning next to a consideration of entrainment, i.e., suspension, gasification, there are examples thereof to be found in the prior art. By way of exemplification and not limitation in this regard, one such example of an entrainment gasification process is that which forms the subject matter of U.S. Pat. No. 4,158,552 entitled "Entrained Flow Coal Gasifier", which issued on Jun. 19, 1979 and which is assigned to the same assignee as the present patent application. In accordance with the teachings of U.S. Pat. No. 4,158,552, a high temperature level of product gas stream is formed by burning primarily char with the existing air supply. Immediately thereafter additional char is introduced into the high temperature stream for gasification of these carbon particles. Then, following the endothermic gasification reaction which cools the gases, new fresh coal is introduced with this coal being devolatilized at relatively low temperature, thus utilizing low temperature heat. Entrained char particles are thereafter removed from the gas stream and reintroduced into the gasifier. The low temperature devolatilization of the fresh coal is achieved by gas temperatures at a level which is insufficient to effectively continue the carbon gasification process. Accordingly, more of the available heat is used for the basic purpose of the coal gasification operation, which is of course to produce gas having the maximum reasonable heating value.

Another example of an entrainment gasification process is that which forms the subject matter of U.S. Pat. No. 4,343,627 entitled "Method of Operating a Two-Stage Coal Gasifier", which issued on Aug. 10, 1982 and which is assigned to the same assignee as the present patent application. In accordance with the teachings of U.S. Pat. No. 4,343,627, an object of the invention disclosed therein is to increase the effectiveness of an entrained flow gasifier by enhancing its ability to produce a product gas having an increased heating value. Moreover, the manner in which this is accomplished is that steam is used as the conveying medium for carrying the additional coal to be injected into the reduction zone from the coal source to the reduction zone. Upon entering the reduction zone, the steam reacts with the additional coal to form carbon monoxide and hydrogen. Therefore, rather than lowering the heating value of the product gas as is the case when either air or inert gas are used as the conveying medium, the steam reacts to form additional carbon monoxide and hydrogen thereby increasing the heating value of the product gas formed in the reduction zone. Further, by using steam as the conveying medium, the possibility of an explosion in the transport line between the coal source and the reduction zone is eliminated.

Yet another example of an entrained gasification process is that which forms the subject matter of U.S. Pat. No. 4,610,697 entitled "Coal Gasification System with Product Gas Recycle to Pressure Containment Chamber", which issued on Sep. 9, 1986 and which is assigned to the same assignee as the present patent application. In accordance with the teachings of U.S. Pat. No. 4,610,697, there is provided a pressurized coal gasifier for producing a clean, particulate free fuel gas suitable for use in a gas turbine-generator or a feedstock for a methanation or other chemical process. The subject gasification system includes a pressure containment chamber surrounding an inner, water-cooled chamber wherein a gasification reaction takes place, a second pressure containment chamber surrounding a process gas heat exchanger for cooling the gas produced by the gasification reaction, and a conduit between the first and second vessels having an outer pressure containing wall and an inner water-cooled transfer duct for conducting the produced gas from the gasifier vessel to the heat exchanger. Continuing, the gasifier vessel includes a slag tap disposed at the bottom for removal of any molten slag produced by the gasification reaction. Differential thermal expansion between the pressure containment chamber and the water-cooled gasifier chamber is accommodated without loss of inter-chamber sealing by a water seal between the chambers without the occurrence of gas leakage into the annular volume.

Still another example of an entrained gasification process is that which forms the subject matter of U.S. Pat. No. 4,680,035 entitled "Two Stage Slagging Gasifier", which issued on Jul. 14, 1987 and which is assigned to the same assignee as the present patent application. In accordance with the teachings of U.S. Pat. No. 4,680,035, a two stage coal gasifier is provided that has a vertically elongated gasifier chamber for upward flow of the gas to an opening at the top. Tubes comprising the walls of the chamber form a centrally located slag tap opening at the bottom of the chamber. In the lower portion of the gasifier is a combustion section where fuel injection nozzles inject coal tangentially along with combustion supporting air to supply the heat source. At an upper elevation is a reductor section wherein additional fuel is introduced for the purpose of gasifying this additional fuel. Between the combustor section and the reductor section there is a centrally located baffle. This baffle is larger in plan area than the tap opening and is arranged so that any slag falling around the baffle will land some distance remote from the slag tap opening. The centrally located baffle minimizes the radiation loss from the combustor to the reductor, blocks the central portion of the gasifier chamber so that gas is not drawn back down from the reductor section, and forces the slag falling from the reductor to enter the combustor at a location outboard of the slag tap opening so that it has time to be heated substantially before passing to the slag tap opening.

Although gasifier systems constructed in accordance with the teachings of the various U.S. patents to which reference has been had hereinbefore have been demonstrated to be operative for the purpose for which they have been designed, there has nevertheless been evidenced in the prior art a need for such gasifier systems to be further improved if increased use thereof is to be realized. To this end, there has been evidenced in the prior art a need for a new and improved gasifier system that would enable higher coal-to-gas efficiencies to be attained through the use thereof than those known to be attainable through the use of currently available forms of gasifier systems. A need has thus been evidenced in the prior art for a new and improved gasifier system that would be capable of outperforming, in terms of cold gas efficiency, hot gas efficiency and carbon conversion, presently existing gasifier systems, be they of the fixed-bed type, of the fluidized-bed type, or of the entrained type. More specifically, there has been evidenced in the prior art a need for a new and improved gasifier system, which is capable of achieving a cold gas efficiency of 85%, a hot gas efficiency of 95% and a carbon conversion of 99.99+%, which is to be contrasted with the performance that is capable of being achieved with current technologies wherein the cold gas efficiency, the hot gas efficiency and the carbon conversion for presently existing forms of fixed-bed gasifier systems are said to be 80%, 85% and 95–98%, respectively, and wherein the cold gas efficiency, the hot gas efficiency and the carbon conversion for presently existing forms of fluid-bed gasifier systems are said to be 72%, 80% and 93–98%, respectively, and wherein the cold gas efficiency, the hot gas efficiency and the carbon conversion for presently existing forms of entrained gasifier systems are said to be 67–70%, 75% and 99.99+%, respectively.

Moreover, there has been evidenced in the prior art a need for such a new and improved gasifier system that would be particularly characterized in a number of respects. In this regard, one such characteristic which such a new and improved gasifier system would desirably possess is that it be of the entrained flow type. Another characteristic which such a new and improved gasifier system would desirably possess is that it embody multiple stages. A third such characteristic which such a new and improved gasifier system would desirably possess is that it be pressurized. A fourth such characteristic which such a new and improved gasifier system would desirably possess is that steam be employed for the transport of char. A fifth such characteristic which such a new and improved gasifier system would desirably possess is that steam also be employed for the transport of coal. A sixth such characteristic which such a new and improved gasifier system would desirably possess is that for purposes of increasing the rate at which gasification reactions take place therewithin as well as for purposes of enhancing slagging the temperature within the first stage would optimally be on the order of 3500° F. A seventh such characteristic which such a new and improved gasifier system would desirably possess is that, if so desired, limestone/dolomite is capable of being employed therewith for purposes of effecting sulfur removal.

To thus summarize, a need has been evidenced in the prior art for such a new and improved gasifier system that would enable higher coal-to-gas efficiencies to be attained therewith and that in doing so would render it possible therewith to outperform prior art forms of gasifier systems in terms of the cold gas efficiency, the hot gas efficiency and the carbon conversion achievable therewith. Moreover, such results would be accomplished with a new and improved gasifier system embodying a first stage within which char combustion would take place at an optimum temperature of 3500° F. so as to thereby both increase the rate at which gasification reactions take place therewithin and to enhance slagging and wherein the char that is combusted within the first stage is transported thereto by means of steam. In addition, such results would be accomplished with a new and improved gasifier system embodying a second stage within which the gasification of the char would take place and wherein the char that is gasified within the second stage is transported thereto by steam. Furthermore, such results would be accomplished with a new and improved gasifier system embodying a third stage within which the coal is devolatilized and wherein the coal that is devolatilized in the third stage is transported thereto by means of steam also. Last but not least, such results would be accomplished with a new and improved gasifier system embodying heat exchanger means whereby the gas in which the char resulting from the devolatilization of the coal is entrained upon leaving the third stage would pass through the heat exchanger means whereby the steam would be produced that would be employed to transport the char to the first stage and the second stage thereof before the char-entrained gas would pass through the separator means within which the char is separated from the gas for transport by means of the aforementioned steam to the first stage and the second stage thereof.

It is, therefore, an object of the present invention to provide a new and improved system for gasifying coal to produce therefrom a fuel gas suitable for firing in a gas turbine, which is part of an integrated gasification combined cycle system (IGCC), or for firing in a steam generator and similar devices.

It is a further object of the present invention to provide such a gasifier system which is of the entrained flow type.

It is another object of the present invention to provide such an entrained flow gasifier system which is pressurized.

It is still another object of the present invention to provide such a pressurized, entrained flow gasifier system which embodies multiple stages.

Another object of the present invention is to provide such a multi-stage, pressurized, entrained flow gasifier system which embodies a first stage within which char combustion takes place at an optimum temperature of 3500° F. so as to thereby increase the rate at which gasification reactions take place therewithin as well as to enhance slagging.

A still another object of the present invention is to provide such a multi-stage, pressurized, entrained flow gasifier system which embodies a second stage within which the gasification of the char takes place.

A further object of the present invention is to provide such a multi-stage, pressurized, entrained flow gasifier system which embodies a third stage within which the coal is devolatilized.

A still further object of the present invention is to provide such a multi-stage, pressurized, entrained flow gasifier system which is characterized in that steam is employed to transport the char to the first stage thereof as well as to the second stage thereof.

Yet an object of the present invention is to provide such a multi-stage, pressurized, entrained flow gasifier system which embodies heat exchanger means through which the gas in which the char is entrained is made to pass upon leaving the third stage such that steam is thereby produced which in turn is employed to thereby effectuate the transport of the char to the first stage and the second stage thereof.

Yet a further object of the present invention is to provide such a multi-stage, pressurized, entrained flow gasifier system which is characterized in that steam also is employed to transport the coal to the third stage thereof.

Yet another object of the present invention is to provide such a multi-stage, pressurized, airblown, entrained flow gasifier system which is characterized by its high performance wherein higher coal-to-gas efficiencies are capable of being attained therewith than those capable of being attained with previously existing forms of gasifier systems.

Yet still another object of the present invention is to provide such a high performance, multi-stage, pressurized, airblown, entrained flow gasifier system which is characterized in its ability to outperform previously existing forms of gasifier systems in terms of cold gas efficiency, hot gas efficiency and carbon conversion.

SUMMARY OF THE PRESENT INVENTION

In accordance with one aspect of the present invention there is provided a high performance, multi-stage, pressurized, airblown, entrained flow gasifier system that is particularly adapted for use in gasifying coal to produce therefrom a fuel gas suitable for firing in a gas turbine, which is a part of an integrated gasification combined cycle system (IGCC), or for firing in a steam generator and similar devices. The subject high performance, multi-stage, pressurized, airblown, entrained flow gasifier system includes a first vessel, a second vessel positioned in surrounding relation to the first vessel such that an annulus is formed therebetween, heat exchanger means located downstream of the first vessel and connected thereto in fluid flow relation therewith, and separator means located downstream of the heat exchanger means and connected thereto in fluid flow relation therewith. The first vessel embodies a first stage within which char combustion primarily takes place at an optimum temperature of 3500° F. so as to thereby increase the rate at which gasification reactions take place therewithin as well as to enhance slagging whereby the slag is made to exit through the slag tap with which the first vessel is suitably provided at one end thereof. The first vessel also embodies a second stage within which the gasification of the char primarily takes place. Finally, the first vessel in addition embodies a third stage within which the coal is devolatilized. The gas, which is produced as a result of the gasification of the char in the second stage of the first vessel flows to and through the third stage of the first vessel and in doing so entrains therewithin the char resulting from the devolatilization of the coal in the third stage of the first vessel. The gas with the char entrained therewithin exits from the other end of the first vessel. After exiting from the first vessel the gas with the char entrained therewithin flows to and through the heat exchanger means. In the course of passing through the heat exchanger means steam is generated therewithin by virtue of the heat exchange that occurs between the gas entrained char flowing through the heat exchanger means and the water flowing through the tubes with which the heat exchanger means is provided for this purpose. The steam produced in the heat exchanger means is employed to transport the char to the first stage as well as the second stage of the first vessel. Upon leaving the heat exchanger means the gas with the char entrained therewithin flows to and through the separator means within which the char is separated from the gas. The char so separated from the gas in the separator means is then transported by the steam produced in the heat exchanger means to the first stage and the second stage of the first vessel. Steam also is employed to transport the coal to the third stage of the first vessel. The second vessel functions as a pressure containment vessel and a suitable pressurized medium is made to flow within the annulus that is formed between the first vessel and the second vessel such that in the event that the first vessel should leak the pressurized medium will flow from the annulus into the first vessel.

In accordance with another aspect of the present invention there is provided a method of operating a high performance, multi-stage, pressurized, airblown, entrained flow gasifier system of the type that is particularly adapted for use in gasifying coal to produce therefrom a fuel gas suitable for firing in a gas turbine, which is a part of an integrated gasification combined cycle system (IGCC), or for firing in a steam generator and similar devices. The subject method of operating a high performance, multi-stage, pressurized, airblown, entrained flow gasifier system includes the steps of providing a reaction vessel, transporting char by means of steam to a first stage of the reaction vessel, combusting the char so transported thereto within the first stage of the reaction vessel at an optimum temperature of 3500° F. in order to thereby increase the rate at which gasification reactions take place as well as to enhance slagging, transporting char by means of steam to a second stage of the reaction vessel, gasifying the char so transported thereto within the second stage of the reaction vessel, transporting coal by means of steam also to a third stage of the reaction vessel, devolatilizing the coal so transported thereto within the third stage of the reaction vessel, entraining the char formed from the devolatilizing of the coal in the third stage of the reaction vessel in the gas produced from the gasification of the char in the second stage of the reaction vessel, passing the gas entrained char in heat exchange relation to water so as to cause the water to be transformed into steam, separating the char from the gas in which the char is entrained, employing the steam produced as a result of passing the gas entrained char in heat exchange relation to water to transport the separated char to the first stage and the second stage of the reaction vessel, providing a pressure containment vessel in surrounding relation to the reaction vessel such that an annulus is formed therebetween, and introducing a pressurized medium into the annulus so that in the event that the reaction vessel should leak the pressurized medium will flow from the annulus into the reaction vessel.

DESCRIPTION OF THE PREFERRED EMBODIMENT

Figure 1:
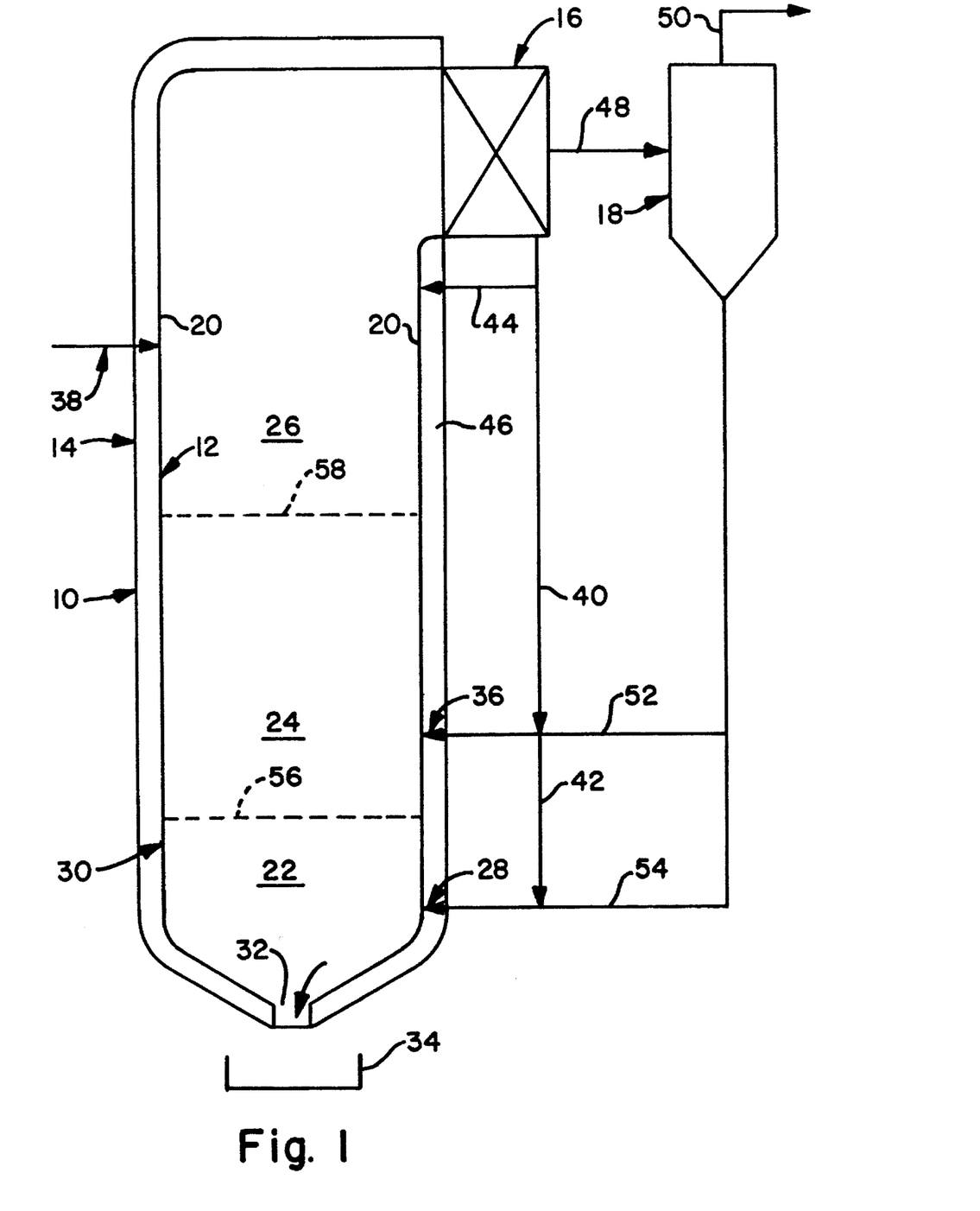
FIG. 1 is a diagrammatic illustration of a first embodiment of a high performance, multi-stage, pressurized, airblown, entrained flow gasifier system constructed in accordance with the present invention.

Referring now to the drawing, and more particularly to FIG. 1 thereof, there is depicted therein one embodiment, generally designated by the reference numeral 10 of a high performance, multi-stage, pressurized, airblown, entrained flow gasifier system in accordance with the present invention. As best understood with reference to FIG. 1, the gasifier system 10 includes a first, i.e., reaction vessel, generally designated by the reference numeral 12, a second, i.e., pressure containment, vessel, generally designated by the reference numeral 14; a heat exchanger means, generally designated by the reference numeral 16; and a separator means, generally designated by the reference numeral 18.

In accordance with the preferred embodiment of the invention, the reaction vessel 12 embodies a construction wherein the walls thereof, denoted by the reference numeral 20 in FIG. 1, consist of a multiplicity of tubes, through which water is designed to flow, that are interconnected one to another such as by fusion welding whereby the reaction vessel 12 constitutes a gas-tight, fusion welded, water-cooled tube wall enclosure, which is similar in construction to that of electric utility boilers. In a fashion similar to that of electric utility boilers, steam is generated within the walls 20 of the reaction vessel 12 through the conversion to steam of the water flowing through the tubes that comprise the walls 20 of the reaction vessel 12. This steam is then available for use within the reaction vessel 12 itself and/or for use externally of the reaction vessel 12 such as, for example, to generate power in a power generation application. However, since the primary function that is to be served by the heat, which is generated within the reaction vessel 12, is to effectuate therewithin the gasification of coal, the reaction vessel 12 is designed so that a slag layer will be retained on the inner surface of the walls 20 of the reaction vessel 12. This slag layer is intended to be operative to limit the heat adsorption in the waterwalls 20 of the reaction vessel 12 to a small percentage of the total heat that is generated within the reaction vessel 12.

With further reference to FIG. 1, the reaction vessel 12 as illustrated therein is divided into three interconnected zones, i.e., stages, which are designated from bottom to top in FIG. 1 by the reference numerals 22, 24 and 26, respectively. These stages 22, 24 and 26 will for ease of reference be henceforth referred to herein as the first, i.e., combustor, stage 22, the second, i.e., diffusor, stage 24 and the third, i.e., reductor, stage 26.

Considering first the combustor stage 22, char, as shown at 28 in FIG. 1, is injected thereinto. The char 28, as will be described more fully hereinafter, is transported to the combustor stage 22 by steam. Approximately two-thirds of the char which is fed into the reaction vessel 12 enters through the combustor stage 22 as char 28. In turn, air, which is required to effectuate the combustion of the char within the combustor stage 22, is injected into the combustor stage 22 as shown at 30 in FIG. 1. The combustion of the char 28 within the combustor stage 22 is designed to produce an optimum temperature therewithin of 3500° F. For purposes of attaining such an optimum temperature of 3500° F., it is necessary that the mixture of char and air burned therewithin be fuel rich. Heretofore, it has been customary to employ temperatures on the order of 3000° F. within the combustor stage of gasifier systems. However, by operating at an optimum temperature, such as 3500° F., it is possible to increase the rate at which the requisite gasification reactions will take place within the reaction vessel 12. In addition, such an optimum temperature also has the effect of enhancing slagging.

The slag, which comprises the mineral matter in the coal that is gasified within the reaction vessel 12, must be maintained in a molten state so that the slag will flow freely within the reaction vessel 12. As depicted at 32 in FIG. 1, the reaction vessel 12 is provided at the bottom thereof with a suitably dimensioned slag tap. It is through the slag tap 32 that the molten slag leaves the reaction vessel 12. Upon passing through the slag tap 32, the molten slag is quenched in a water filled slag tank denoted by the reference numeral 34 in FIG. 1, and as a consequence thereof becomes an inert, glassy, granular material.

The hot gases, which are generated within the combustor stage 22 from the combustion therewithin of the fuel-rich mixture of char and air, rise within the reaction vessel 12, and in doing so leave the combustor stage 22 and enter the diffusor stage 24 of the reaction vessel 12. As depicted at 36 in FIG. 1, additional char, i.e., the remaining one-third of the char which is fed to the reaction vessel 12, is injected into the diffusor stage 24. The char 36, as in the case of the char 28, is transported by steam in a manner to be more fully described hereinafter. Gasification of the char 36 takes place within the diffusor stage 24. The range of temperatures that exist within the diffusor stage 24 at which this gasification takes place is between 1700° F. and 2900° F. The gasification reactions that occur within the reaction vessel 12 are endothermic and continue until the temperature within the reaction vessel 12 drops to a point where the reaction rate becomes too low, i.e., wherein the temperature becomes too low within the reaction vessel 12 to effectively support the desired gasification reactions therewithin. As was pointed out previously herein in connection with the discussion of the combustor stage 22, the higher the temperatures that are generated within the reaction vessel 12 the faster the desired gasification reactions will take place therewithin.

Although because of the endothermic nature of the gasification reactions that take place within the reaction vessel 12 and in particular within the diffusor stage 24 thereof, the temperature of the gases as they continue to rise within the reaction vessel 12 and leave the diffusor stage 24 and enter the reductor stage 26 becomes too low, i.e., below 1700° F., to effectively support further gasification of any of the char that may remain from the char 28 and the char 36, which have been injected into the combustor stage 22 and the diffusor stage 24, respectively, of the reaction vessel 12. However, the gases as they enter the reductor stage 26 of the reaction vessel 12 are still sufficiently high enough, i.e., above 1400° F. within the reductor stage 26, to be utilized for purposes of effectuating the devolatilization of coal and the cracking of the volatile fraction thereof, such cracking thereof being desirable from the standpoint of preventing the formation of tars and condensible oils.

Accordingly, the coal that it is desired to gasify within the reaction vessel 12 is thus introduced, as shown at 38 in FIG. 1, into the reductor stage 26 thereof. In accordance with the illustration of the gasifier system 10 in FIG. 1, the coal 38 is transported to the reductor stage 26 by steam also. It is to be understood, however, that if so desired the coal 38 could, without departing from the essence of the present invention, be transported to the reductor stage 26 by other means, such as flue gas, product gas, $N_2$ or even air. The steam referred to hereinbefore for transporting the coal 38 could, for example, be some of the steam, which is generated within the heat exchanger means 16.

Continuing with the description thereof, the reaction vessel 12 in terms of its width is preferably suitably dimensioned such that the gases as they rise within the reaction vessel 12 do so with a velocity starting at the bottom of the reaction vessel 12, as viewed with reference to FIG. 1 of the drawing, of approximately thirty feet per second. This velocity decreases as the gases continue to rise within the reaction vessel 12. In terms of height, the reaction vessel 12 preferably is suitably dimensioned such that the gases as they rise within the reaction vessel 12 are capable of traversing the length thereof in approximately two to three seconds, i.e., the residence time of the gases within the reaction vessel 12 is on the order of two to three seconds. Obviously, therefore, there exists a need for the requisite gasification reactions to take place as quickly as possible within the reaction vessel 12. Otherwise, there will be insufficient residence time of the char 36 within the diffusor stage 24 for the gasification thereof to occur therewithin, before the char 36, being entrained in the gases rising within the reaction vessel 12, is carried therewith from the diffusor stage 24 to the reductor stage 26, and eventually, along with the char that is formed as a consequence of the devolatilization of the coal in the reductor step 26, is carried out of the reactor vessel 12.

By way of a brief summarization of the preceding description of the reaction vessel 12, char 28, which is transported thereto by steam, is injected into the combustor stage 22 of the reaction vessel 12 and is combusted therewithin with the air 30 that for this purpose is also injected into the combustor stage 22 such that an optimum temperature on the order of 3500° F. is created therewithin. The hot gases generated as a result of the combustion of the char 28 and the air 30 therewithin leaves the combustor stage 22 and enters the diffusor stage 24 of the reaction vessel 12. Within the diffusor stage 24, the $CO_2$ and $H_2O$ present in the hot gases react with the char 36, which is injected into the diffusor stage 24, and as a consequence thereof causes the char 36 to gasify. The gasification reactions by which the char 36 becomes gasified are endothermic and continue until the temperature drops to a point where the reaction rate becomes too low, i.e., below approximately 1700° F., to effectively support further gasification of the char 36. It is at this point, i.e., when the temperature thereof drops to around 1700° F., that the gases, which are rising within the reaction vessel 12, leave the diffusor stage 24 and enter the reductor stage of the reaction vessel 12. The temperature of the gases is still sufficiently high enough, i.e., above approximately 1400° F., within the reductor stage 26, however, to cause rapid devolatilization therewithin of the coal 38 that is injected into the reductor stage 26 as well as the cracking of the volatile fraction thereof thereby preventing the formation therefrom of tars and condensible oils. After completing its traverse of the reductor stage 26 of the reaction vessel 12, the char, which consists of a mixture of unburned carbon and ash, is carried out of the reaction vessel 12 along with the product gas stream, by virtue of being entrained therewithin, that has been produced within the reaction vessel 12.

From the reaction vessel 12, the product gas stream with the char still entrained therewithin flows to and through the heat exchanger means 16, the latter as illustrated in FIG. 1 of the drawing being located in the gasifier system 10 such as to be located downstream of the reaction vessel 12 and more specifically, downstream of the reductor stage 26 of the reaction vessel 12. In known fashion, the heat exchanger means 16 is suitably provided with tubes through which water is caused to flow. Accordingly, as the product gas stream, with the char still entrained therewithin, that has been produced within the reaction vessel 12 flows through the heat exchanger means 16, the product gas stream gives up sufficient heat to transform to steam the water that is flowing through the tubes of the heat exchanger means 16. A portion of the steam, which is so produced within the heat exchanger means 16, is employed, as depicted schematically at 40 and 42, respectively, in FIG. 1 of the drawing, for purposes of transporting the char 36 to the diffusor stage 24 and the char 28 to the combustor stage 22 of the reaction vessel 12. In addition, for a purpose which will be discussed herein more fully subsequently, another portion of the steam so produced in the heat exchanger means 16 is also supplied, as illustrated schematically at 44 in FIG. 1 of the drawing, to the annulus, denoted by the reference numeral 46 in FIG. 1, that exists between the reaction vessel 12 and the pressure containment vessel 14.

After flowing through the heat exchanger means 16, the product gas stream with the char still entrained therewithin, flows, as depicted schematically at 48 in FIG. 1, to the separator means 18. The separator means 18 may take the form of a cyclone, or any other similar conventional device, that is operative to effectuate therewithin the separation of the char, which is entrained within the product gas stream, from the product gas stream itself. Following the separation of the char therefrom, the product gas stream, as depicted at 50 in FIG. 1 of the drawing, exits from the separator means 18. Likewise, the char, following the separation thereof from the product gas stream in the separator means 18, also exits from the separator means 16 and as illustrated schematically at 52 and 54, respectively, in FIG. 1 is recycled back to the reaction vessel 12 and more specifically to the diffusor stage 24 and the combustor stage 22 of the reaction vessel 12. To this end, as has been described more fully hereinbefore, a portion of the steam that is produced within the heat exchanger means 16 is utilized to effect the transport of the char, which is separated from the product gas stream within the separator means 18, to the diffusor stage 24 and the combustor stage 22, respectively, of the reaction vessel 12.

Continuing with the description of the gasifier system 10 as depicted schematically in FIG. 1 of the drawing, the reaction vessel 12, as best understood with reference to FIG. 1, is suitably surrounded by the pressure containment vessel 14 such that there exists therebetween the annulus 46, to which reference has briefly been made hereinbefore. The annulus 46 in turn is designed to be filled with a suitable pressurized medium. In the case of the embodiment of the gasifier system 10, which is depicted in FIG. 1 of the drawing, the pressurized medium, as shown therein at 44, comprises steam. Moreover, as has been described hereinbefore this steam 44 represents a portion of the steam, which is produced within the heat exchanger means 16, from the heat exchange that occurs therewithin between the product gas stream in which the char is entrained and the water flowing through the tubes of the heat exchanger means 16 as the product gas stream in which the char is contained is made to pass through the heat exchanger means 16 upon exiting from the reductor stage 26 of the reaction vessel 12. The steam 44 which fills the annulus 46 is suitably pressurized such that the pressure thereof is greater than the pressure within the reaction vessel 12. As such, since the steam 44 within the annulus 46 is at a greater pressure than the pressure within the reaction vessel 12, in the event that a leak should occur in the reaction vessel 12 the steam 44 will thus flow from the annulus 46 into the reaction vessel 12. The pressure containment vessel 14, as will be best understood with reference to FIG. 1 of the drawing, is suitably provided with a plurality of openings such as to permit the molten slag to flow to the water filled slag tank 34, to permit the char 28 to be injected into the combustor stage 22 of the reaction vessel 12, to permit the air 30 to be injected into the combustor stage 22 of the reaction vessel 12, to permit the char 36 to be injected into the diffusor stage 24 of the reaction vessel 12, to permit the coal 38 to be injected into the reductor stage 26 of the reaction vessel 12, to permit the steam 44 to flow into the annulus 46 between the reaction vessel 12 and the pressure containment vessel 14, and to permit the product gas stream in which the char is entrained to leave the reaction vessel 12, and more specifically the reductor stage 26 thereof, and enter the heat exchanger means 16. Finally, it should be clearly understood that the reaction vessel 12 in terms of its actual physical configuration is continuous in length, and that although from the standpoint of what occurs within the reaction vessel 12 the reaction vessel 12 may be considered to embody the three stages, i.e., the combustor stage 22, the diffusor stage 24 and the reductor stage 26, that have been described in detail hereinbefore, the demarcation between these various stages has been depicted, simply for ease of reference, through the use of the imaginary, dotted lines that are denoted by the reference numerals 56 and 58 in FIG. 1 such that the dotted line 56 as employed in FIG. 1 is simply intended to illustrate the approximate location within the reaction vessel 12 whereat the combustor stage 22 ends and the diffusor stage 24 begins whereas the dotted line 58 as employed in FIG. 1 is simply intended to illustrate the approximate location within the reaction vessel 12 whereat the diffusor stage 24 ends and the reductor stage 26 begins.

A discussion will now be had herein of a second embodiment of a high performance, multi-stage, pressurized, airblown, entrained flow coal gasifier system. For purposes of this discussion, reference will be had particularly to FIG. 2 of the drawing wherein the subject second embodiment of a high performance, multi-stage, pressurized, airblown, entrained flow coal gasification system has been denoted generally, for ease of reference, by reference numeral 10'. Inasmuch as the gasifier system 10' is very similar, both in terms of its construction and its mode of operation, to the gasifier system 10 of FIG. 1, those components of the gasifier system 10' of FIG. 2 that are the same as the components of the gasifier system 10 of FIG. 1 are denoted in both FIG. 1 and FIG. 2 of the drawing by the same reference numeral. The primary difference between the gasifier system 10 of FIG. 1 and the gasifier system 10' of FIG. 2 resides in the fact that in the case of the gasifier system 10 of FIG. 1 the pressurized medium that is employed in the annulus 46 that exists between the reaction vessel 12 and the pressure containment vessel 14 is steam that is supplied thereto as shown at 44 in FIG. 1 from the heat exchanger means 16, whereas in a manner to be described more fully hereinafter the pressurized medium that is employed in the annulus 46 that exists between the reaction vessel 12 and the pressure containment vessel 14 is a portion of the product gas that has been produced in the reaction vessel 12 and from which the char has been separated in the separator means 18.

Figure 2:
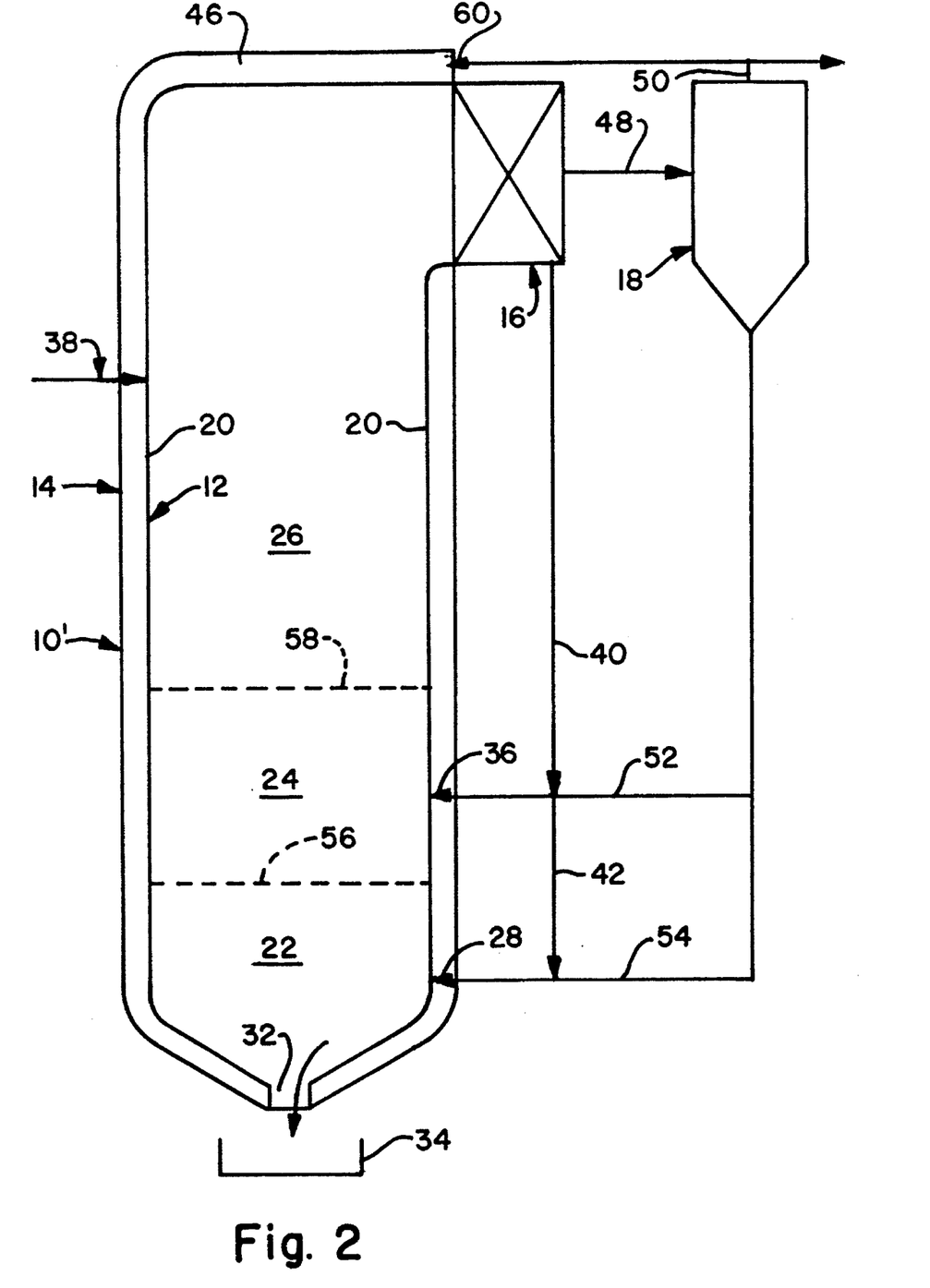
FIG. 2 is a diagrammatic illustration of a second embodiment of a high performance, multi-stage, pressurized, airblown, entrained flow gasifier system constructed in accordance with the present invention.

Continuing with the description thereof, the gasifier system 10' of FIG. 2, like the gasifier system 10 of FIG. 1, includes a first, i.e., reaction, vessel, generally designated by the reference numeral 12; a second, i.e., pressure containment, vessel, generally designated by the reference numeral 14; a heat exchanger means, generally designated by the reference numeral 16; and a separator means, generally designated by the reference numeral 18. In both the gasifier system 10 of FIG. 1 and the gasifier system 10' of FIG. 2, the reaction vessel 12 embodies a construction wherein the walls 20 thereof consist of a multiplicity of tubes, through which water is designed to flow, that are interconnected one to another such as by fusion welding whereby the reaction vessel 12 constitutes a gas-tight, fusion welded, water-cooled tube wall enclosure. Moreover, in the case of the gasifier system 10' of FIG. 2, as in the case of the gasifier system 10 of FIG. 1, the char 28, which is transported thereto by steam, is injected into the combustor stage 22 of the reaction vessel 12 and is combusted therewithin with the air 30 that for this purpose is also injected into the combustor stage 22 such that an optimum temperature on the order of 3500° F. is generated within the combustor stage 22. The hot gases generated as a result of the combustion of the char 28 and the air 30 rise within the reaction vessel 12, leaving the combustor stage 22 and entering the diffusor stage 24. Within the diffusor stage 24, the $CO_2$ and $H_2O$ present in the hot gases react with the char 36 resulting in the gasification of the char 36, i.e., the generation of product gas. The gasification reactions by which the char 36 becomes gasified are endothermic and continue until the temperature drops to a point where the reaction rate becomes too slow, i.e., below approximately 1700° F., to effectively support further gasification of the char 36. It is at this point that the gases, which are rising within the reaction vessel 12, leave the diffusor stage 24 and enter the reductor stage 26 of the reaction vessel 12. The temperature of the gases within the reductor stage 26 is still sufficiently high enough, i.e., above approximately 1400° F., to cause rapid devolatilization therewithin of the coal that is injected into the reductor stage 26 as well as the cracking of the volatile fraction thereof thereby preventing the formation therefrom of tars and condensible oils. After completing its traverse of the reductor stage 26 of the reaction vessel 12, the char, which consists of a mixture of unburned carbon and ash, that results from the devolatilization of the coal 38 within the reductor stage 26 is carried out of the reaction vessel 12 along with the product gas stream, by virtue of being entrained therewithin, that has been produced within the reaction vessel 12. From the reaction vessel 12, the product gas stream with the char still entrained therewithin flows to and through the heat exchanger means 16. As the product gas stream, with the char still entrained therewithin, flows through the heat exchanger means 16, the product gas stream gives up sufficient heat to transform to steam the water that is flowing through the tubes of the heat exchanger means 16. A portion of the steam, i.e., the steam 40 and 42, which is so produced within the heat exchanger means 16, is employed for purposes of transporting the char 36 to the diffusor stage 24 and the char 28 to the combustor stage 22, respectively. After flowing through the heat exchanger means 16, the product gas stream, with the char still entrained therewithin, flows as seen at 48 to the separator means 18. The separator means 18 is operative to effectuate therewithin the separation from the product gas stream itself of the char which is entrained within the product gas stream. Following the separation of the char therefrom, the product gas stream as seen at 50 in both FIG. 1 and FIG. 2 of the drawing exits from the separator means 18. Moreover, in accord with the embodiment of the high pressure, multi-stage, pressurized, airblown, entrained flow coal gasification system which is denoted as gasifier system 10' in FIG. 2 of the drawing, a portion of the product gas stream that exits from the separator means 18, for a purpose to be discussed hereinafter, is supplied, as illustrated schematically at 60 in FIG. 2 of the drawing, to the annulus 46 that exists between the reaction vessel 12 and the pressure containment vessel 14. The char, following the separation thereof from the product gas stream in the separator means 18, is recycled back as seen at 52 and 54 in both FIG. 1 and FIG. 2 of the drawing to the diffusor stage 24 and the combustor stage 22, respectively, of the reaction vessel 12.

With further regard to the description of the gasifier system 10' as illustrated in FIG. 2 of the drawing, the reaction vessel 12 is suitably surrounded by the pressure containment vessel 14 such that there exists therebetween the annulus 46. The annulus 46 in turn is designed to be filled with a suitable pressurized medium. Further, in accord with the illustration thereof in FIG. 2 of the drawing, the pressurized medium, which fills the annulus 46 of the gasifier system 10', comprises the product gas 60. Moreover, as has been described hereinbefore this product gas 60 constitutes a portion of the product gas stream 50 that exits from the separator means 18. The product gas 60, which fills the annulus 46 of the gasifier system 10', is suitably pressurized such that the pressure thereof is greater than the pressure within the reaction vessel 12 of the gasifier system 10'. Thus, should a leak develop in the reaction vessel 12 of the gasifier system 10', the product gas 60, being at a greater pressure than the pressure in the reactor vessel 12 of the gasifier system 10', will flow from the annulus 46 of the gasifier system 10' into the reaction vessel 12 of the gasifier system 10'.

Next, a discussion will be had herein of a third embodiment of a high performance, multi-stage, pressurized, airblown, entrained flow coal gasifier. For purposes of this discussion, reference will be had particularly to FIG. 3 of the drawing wherein the subject third embodiment of a high performance, pressurized, airblown, entrained flow coal gasification system has been denoted generally, for ease of reference, by reference numeral 10". Inasmuch as the gasifier system 10" is very similar, both in terms of its construction and its mode of operation, to the gasifier system 10 of FIG. 1, those components of the gasifier system 10" of FIG. 3 that are the same as the components of the gasifier system 10 of FIG. 1 are denoted in both FIG. 1 and FIG. 3 of the drawing by the same reference numeral. The primary difference between the gasifier system 10 of FIG. 1 and the gasifier system 10" of FIG. 3 resides in the fact that in addition to embodying all of the same components which the gasifier system 10 of FIG. 1 embodies, the gasifier system 10" of FIG. 3 further embodies sulfur removal means, generally designated in FIG. 3 by the reference numeral 62, and slag baffle means, generally designated in FIG. 3 by the reference numeral 64.

Figure 3:
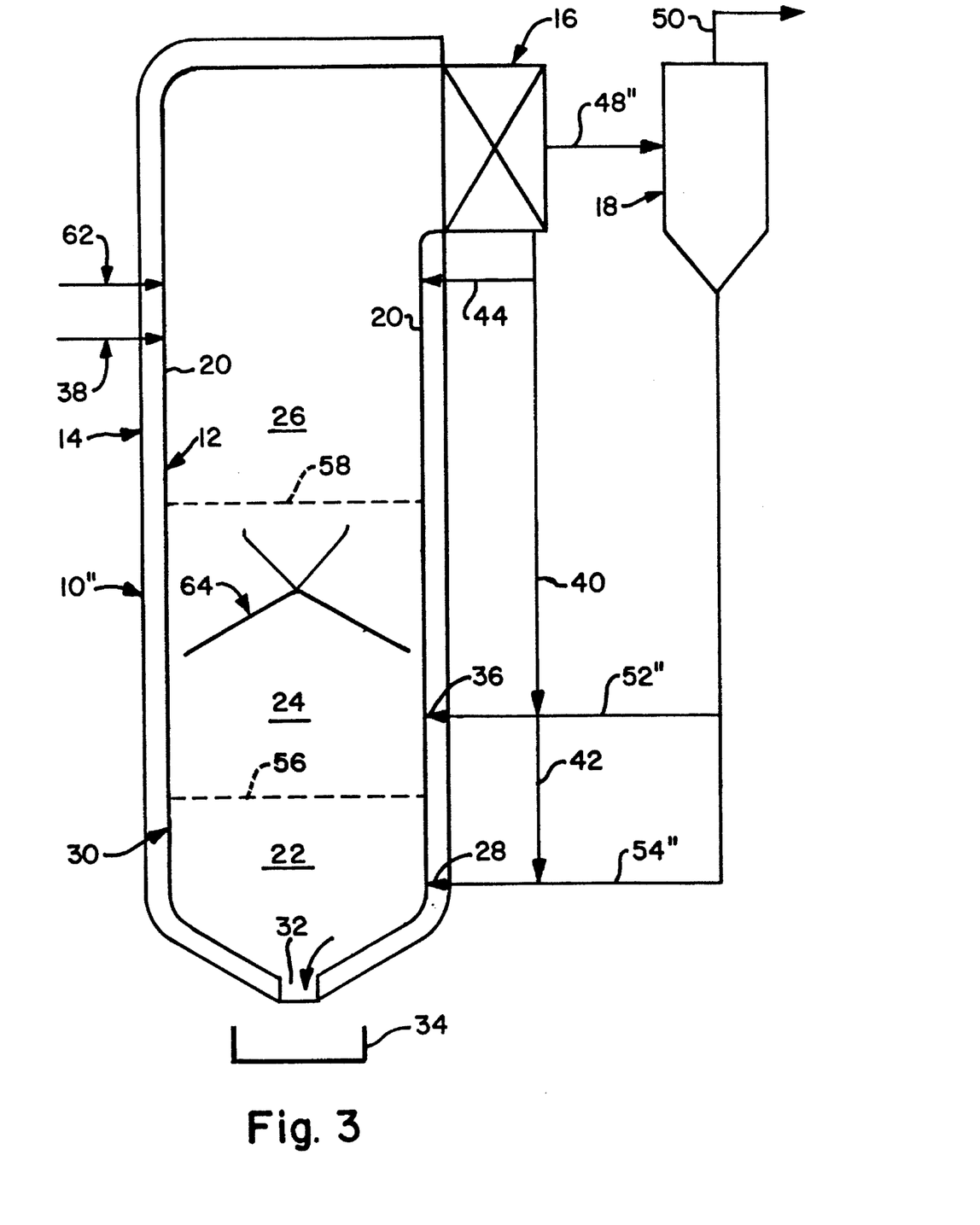
FIG. 3 is a diagrammatic illustration of a third embodiment of a high performance, multi-stage, pressurized, airblown, entrained flow gasifier system constructed in accordance with the present invention.

Continuing with the description of the gasifier system 10" of FIG. 3, it is deemed to be unnecessary to once again set forth herein a description of the components, which the gasifier system 10 of FIG. 1 embodies and which are also embodied in the gasifier system 10" of FIG. 3. Should a description of such components need to be referred to herein, reference may be had for this purpose to the description thereof which has been set forth hereinbefore in connection with the discussion of the gasifier system 10 of FIG. 1. As such, the description of the gasifier system 10" of FIG. 3 which follows will be limited to a description of the sulfur removal means 62 of the gasifier system 10" and to a description of the slag baffle means 64 of the gasifier system 10".

Considering first the sulfur removal means 62, in accord with the illustrated embodiment thereof in FIG. 3 of the drawing, the sulfur removal means 62 preferably comprises means for injecting limestone and/or dolomite into the reductor stage 26 of the reaction vessel 12 of the gasifier system 10". The purpose of so injecting limestone and/or dolomite therein is to effectuate the capture therewithin of any sulfur that may be contained in the gases rising within the reaction vessel 12 of the gasifier system 10". Namely, by way of exemplification and not limitation, the calcium of the limestone, for example, reacts with any sulfur contained in the gases, which are rising within the reaction vessel 12 of the gasifier system 10", to form sulfur compounds. In turn, these sulfur compounds become entrained in the product gas along with the char, and are carried out of the reaction vessel 12 of the gasifier system 10" with the product gas. Thereafter, the sulfur compounds like the char remain entrained in the product gas as the product gas flows to and through the heat exchanger means 16. From the heat exchanger means 16, the product gas with both the char and sulfur compounds entrained therewithin flows, as shown at 48" in FIG. 3, to the separator means 18 in which both the char and the sulfur compounds are separated from the product gas. Afterwards, the product gas, as shown at 50 in FIG. 3, exits from the separator means 18, and both the char and the sulfur compounds exit from the separator means 18 and are recycled, as shown at 52" and 54" in FIG. 3, to the diffusor stage 24 and the combustor stage 22, respectively, of the reaction vessel 12 of the gasifier system 10". The sulfur compounds that are recycled with the char 28 and 36 back to the reactor vessel 12 of the gasifier system 10" are discharged therefrom as part of the slag through the slag tap 32 thereof.

Next, as regards the slag baffle means 64, in accord with the illustrated embodiment thereof in FIG. 3 of the drawing, the slag baffle means 64 preferably includes a baffle suitably located within the diffusor stage 24 of the reactor vessel 12 of the gasifier system 10". Any conventional form of support means (not shown in the interest of maintaining clarity of illustration in the drawing) suitable for use for such a purpose may be utilized for purposes of supporting the subject baffle within the diffusor stage 24 in suitably spaced relation to the sidewalls 20 of the reaction vessel 12 of the gasifier system 10". When so supported, the subject baffle is designed to be operative to block the central portion of the gasifier system 10". As such, any slag falling from the diffusor stage 24 of the reaction vessel 12 of the gasifier system 10" into the combustor stage 22 thereof will fall outward of the slag tap opening 32 thereby providing adequate time for the slag to become sufficiently heated to permit the slag to flow freely to and through the slag tap opening 32 of the reaction vessel 12 of the gasifier system 10".

Thus, in accordance with the present invention there has been provided a new and improved system for gasifying coal to produce therefrom a fuel gas suitable for firing in a gas turbine, which is part of an integrated gasification combined cycle system (IGCC), or for firing in a steam generator and similar devices. Plus, there has been provided in accord with the present invention such a gasifier system which is of the entrained flow type. Besides, in accordance with the present invention there has been provided such an entrained flow gasifier system which is pressurized. As well, there has been provided in accord with the present invention such a pressurized, entrained flow gasifier system which embodies multiple stages. Moreover, in accordance with the present invention there has been provided such a multi-stage, pressurized, entrained flow gasifier system which embodies a first stage within which char combustion takes place at an optimum temperature of 3500° F. so as to thereby increase the rate at which gasification reactions take place as well as to enhance slagging. Also, there has been provided in accord with the present invention such a multi-stage, pressurized, entrained flow gasifier system which embodies a second stage within which the gasification of the char takes place. Further, in accordance with the present invention there has been provided such a multi-stage, pressurized, entrained flow gasifier system which embodies a third stage within which the coal is devolatilized. In addition, there has been provided in accord with the present invention such a multistage, pressurized, entrained flow gasifier system which is characterized in that steam is employed to transport the char to the first stage thereof as well as to the second stage thereof. Furthermore, in accordance with the present invention there has been provided such a multi-stage, pressurized, entrained flow gasifier system which embodies heat exchanger means through which the gas in which the char is entrained is made to pass upon leaving the third stage such that steam is produced which in turn is employed to thereby effectuate the transport of the char to the first stage and to the second stage thereof. Additionally, there has been provided in accord with the present invention such a multi-stage, pressurized, entrained flow gasifier system which is characterized in that steam also is employed to transport the coal to the third stage thereof. Penultimately, in accordance with the present invention there has been provided such a multistage, pressurized, airblown, entrained flow gasifier system which is characterized by its high performance wherein higher coal-to-gas efficiencies are capable of being attained therewith than those capable of being attained with previously existing forms of gasifier systems. Finally, there has been provided in accord with the present invention such a high performance, multi-stage, pressurized, airblown, entrained flow gasifier system which is characterized in its ability to outperform previously existing forms of gasifier systems in terms of cold gas efficiency, hot gas efficiency and carbon conversion.

While several embodiments of my invention have been shown, it will be appreciated that modifications thereof, some of which have been alluded to hereinabove, may still be readily made thereto by those skilled in the art. I, therefore, intend by the appended claims to cover the modifications alluded to herein as well as all the other modifications which fall within the true spirit and scope of my invention.

What is claimed is:

1. In a method of operating a high performance, multi-stage, pressurized, airblown, entrained flow gasifier system that is operative for gasifying coal to produce a product gas therefrom including the steps of providing a first vessel having embodied therein a first stage, a second stage and a third stage, injecting char into the first stage of the first vessel, injecting air into the first stage of the first vessel, effecting the combustion of the char and the air within the first stage of the first vessel thereby producing slag, injecting char into the second stage of the first vessel, effecting the gasification of the char within the second stage of the first vessel to produce a product gas therefrom, injecting coal into the third stage of the first vessel, effecting the devolatilization of the coal within the third stage of the first vessel to produce char therefrom, discharging the slag from the first vessel, discharging the product gas with the char entrained therewithin from the first vessel, providing a second vessel in surrounding relation to the first vessel such that an annulus is formed between the first vessel and the second vessel, and filling the annulus so that the pressure therewithin is greater than the pressure within the first vessel such that if a leak occurs within the first vessel the direction of flow will be from the annulus into the first vessel, the improvement comprising the steps of:

a. providing a heat exchanger having water flowing therein in juxtaposed relation to the first vessel downstream thereof and connected in fluid flow relation therewith for receiving directly from the first vessel the product gas having char entrained therewithin;

b. effecting within the heat exchanger as a consequence of a heat exchange between the product gas having char entrained therewithin and the water flowing in the heat exchanger the production of the steam required for the operation of the high performance, multi-stage, pressurized, airblown, entrained flow gasifier system and the cooling of the product gas having char entrained therewithin;

c. discharging to the annulus from the heat exchanger a first portion of the steam produced in the heat exchanger solely sufficient to fill the annulus with steam at a pressure greater than the pressure within the first vessel;

d. providing a separator device downstream of the heat exchanger and connected in fluid flow relation therewith for receiving therefrom the product gas having char entrained therewithin after the product gas having char entrained therewithin has been cooled in the heat exchanger;

e. effecting the separation of the char from the product gas within the separator device;

f. discharging the product gas from the separator device;

g. discharging the char from the separator device into the remaining portion of the steam being discharged from the heat exchanger such that the remaining portion of the steam from the heat exchanger solely constitutes all of the steam that is required for purposes of effecting therewith the transport of the char separated in the separator device to the first stage of the first vessel for injection thereinto and to the second stage of the first vessel for injection thereinto;

h. injecting limestone/dolomite into the third stage of the first vessel for reaction with any sulfur that may be present in the first vessel to form sulfur compounds for subsequent discharge along with the product gas from the first vessel; and i. supporting a slag baffle within the second stage of the first vessel so as to block off the central portion of the first vessel thereby causing any slag falling from the second stage into the first stage of the first vessel to fall outwardly of the central portion thereof.

* * * * *